US012330955B2

(12) United States Patent
Pan et al.

(10) Patent No.: US 12,330,955 B2
(45) Date of Patent: Jun. 17, 2025

(54) METHOD FOR RECOVERING HIGH-PURITY SODIUM BROMIDE FROM BROMINE-CONTAINING CRUDE SALT

(71) Applicant: Beijing University of Technology, Beijing (CN)

(72) Inventors: Dean Pan, Beijing (CN); Guanjun Li, Beijing (CN)

(73) Assignee: BEIJING UNIVERSITY OF TECHNOLOGY, Beijing (CN)

(*) Notice: Subject to any disclaimer, the term of this patent is extended or adjusted under 35 U.S.C. 154(b) by 145 days.

(21) Appl. No.: 17/626,805

(22) PCT Filed: Sep. 18, 2021

(86) PCT No.: PCT/CN2021/119297
§ 371 (c)(1),
(2) Date: Jan. 12, 2022

(87) PCT Pub. No.: WO2022/160742
PCT Pub. Date: Aug. 4, 2022

(65) Prior Publication Data
US 2024/0010507 A1 Jan. 11, 2024

(30) Foreign Application Priority Data
Jan. 28, 2021 (CN) .......................... 202110120746.6

(51) Int. Cl.
C01D 3/10 (2006.01)
B01D 9/00 (2006.01)
B01D 11/04 (2006.01)

(52) U.S. Cl.
CPC ............. C01D 3/10 (2013.01); B01D 9/0018 (2013.01); B01D 11/0488 (2013.01); B01D 11/0492 (2013.01)

(58) Field of Classification Search
CPC .... C01D 3/10; B01D 9/0018; B01D 11/0488; B01D 11/0492
See application file for complete search history.

(56) References Cited

U.S. PATENT DOCUMENTS 9,850,129 B2 * 12/2017 Sarmili ................... C01F 11/34

FOREIGN PATENT DOCUMENTS

| CN | 1172167 | 2/1998 |
| CN | 102534226 | 7/2012 |

(Continued)

Primary Examiner — Richard M Rump
(74) Attorney, Agent, or Firm — Leonid Kisselev

(57) ABSTRACT

The invention belongs to the field of bromine recovery from waste circuit board, and particularly relates to a method for recovering high-purity sodium bromide from bromine-containing crude salt. The invention mainly includes the steps of acidification oxidation, multi-stage extraction, and cooperative back extraction. Compared with traditional chlorine oxidation and single urea back extraction technology, the acidification oxidation process can be effectively controlled by reasonable adjustment of the added amount of hydrochloric acid and sodium chlorate, and the tail gas can be absorbed and reused to avoid secondary pollution and resource waste. At the same time, urea is used with sodium carbonate for cooperative back extraction to achieve a high back extraction rate which greatly reduces the amount of urea, and obtains high-purity sodium bromide crystals. The efficient recovery of bromine resources in bromine-containing crude salt is realised. The benefits of the invention are: high product purity, simple operation, environmental friendliness.

4 Claims, 1 Drawing Sheet

(56) References Cited

FOREIGN PATENT DOCUMENTS

| | | |
|---|---|---|
| CN | 104046776 | 9/2014 |
| CN | 105712298 | 6/2016 |
| CN | 109081310 | 12/2018 |
| CN | 110902747 | 3/2020 |
| GB | 285915 | 9/1928 |

\* cited by examiner

METHOD FOR RECOVERING HIGH-PURITY SODIUM BROMIDE FROM BROMINE-CONTAINING CRUDE SALT

CROSS-REFERENCE TO RELATED APPLICATIONS

This patent application is the U.S. National Phase patent application under 35 U.S.C. § 371, which claims priority to International Application No. PCT/CN2021/119297, filed on Sep. 18, 2021, which in turn claims the benefit of priority to Chinese Patent Application No. 202110120746.6, filed on Jan. 28, 2021, the disclosures of which are incorporated by reference herein.

TECHNICAL FIELD

The invention belongs to the field of bromine recovery from waste circuit board, and particularly relates to a method for recovering high-purity sodium bromide from bromine-containing crude salt.

BACKGROUND

Circuit boards are an important part of electronic appliances, accounting for about 4% to 7% of the total amount of electronic waste, and its output is showing an increasing trend.

There are many types of circuit boards, but the basic composition includes 40% metal, 30% resin and plastic, and 30% glass fiber, which contains a variety of elements, such as copper, lead, tin, gold, silver and non-metallic bromine, etc., it has high-value for recycling.

pyrogenic disposal of waste circuit boards is mainly through incineration, heating and melting, etc., which can effectively reduce the volume of waste circuit boards and obtain metal-rich groups. It has the advantages of large processing capacity and high recovery.

Among them, pyrolysis technology, collaborative smelting technology and self-heating smelting technology are commonly used pyrogenic disposal technologies, but because the brominated flame retardant in the waste circuit board will decompose and escape in the form of flue gas or pyrolysis gas during the disposal process, the product of the tail gas absorption contains bromine-containing crude salt or bromide in the soot. It will pollute the environment and lose the bromine and other resources in it. At the same time, sodium bromide is a widely used chemical. It can be used in the photosensitive industry, perfume industry, printing and dyeing industry and other industries. It can also be used for trace determination of cadmium, bromide production, inorganic and organic synthesis, and photographic paper plates. Currently used preparation methods for sodium bromide mainly include neutralization and reduction, but both require the supply of raw bromine or hydrogen bromide which is expensive. Therefore, recovery of high-purity sodium bromide from bromine-containing crude salt has considerable economic value. CN107138036A proposes to reduce the acid gas and dioxin content of the smelting flue gas through quenching, power wave washing, lye absorption and activated carbon adsorption, but does not pay attention to the subsequent recovery of bromine-containing crude salt, which is likely to cause secondary pollution. Shen Chao uses chlorine oxidation to enrich the bromine resources in the immersion solution of smelting soot, but there are problems such as high toxicity of chlorine, untreated excess chlorine, and difficult control of the operation. At the same time, single urea back extraction has low efficiency, and the product contains a large amount of urea impurities.

The present invention proposes to use hydrochloric acid and sodium chlorate for acidification and oxidation, to effectively control the acidification and oxidation process by adjusting the amount of hydrochloric acid and sodium chlorate, absorb and reuse tail gas, avoid secondary pollution and waste of resources, use urea and sodium carbonate cooperative back extraction achieves a high back extraction rate under alkaline conditions, greatly reduces the amount of urea, and improves the purity of the product.

SUMMARY

The purpose of the present invention is to solve the problems of difficult control of bromine salt conversion, low recovery rate and low product purity during the recovery process of bromine-containing crude salt. The invention disclosed a method of directly recovering and preparing high-purity sodium bromide from crude salt with efficient conversion and enrichment through acidification oxidation, multi-stage extraction, and cooperative back extraction, and has the characteristics of high product purity, simple operation, and environmental friendliness.

A method for recovering high-purity sodium bromide from bromine-containing crude salt according to the present invention is carried out in the following steps:

(1) Immersion and filtration: the bromine-containing crude salt is immersed in tap water and filtered; the ratio of volume of tap water to the mass of bromine-containing crude salt is 3:1-5:1 L/kg, the bromine-containing crude salt is immersed with 10-20 min under 25-35° C. to obtain immersion solution and immersion residue, in which the mass ratio of bromine-containing crude salt is 5-25%;

(2) Acidification and oxidation: the immersion solution obtained in step (1) is acidified with 36% concentrated hydrochloric acid, and then sodium chlorate is added with fully stirred, during the period, the pH of the system is maintained at 0-1 with concentrated hydrochloric acid to obtain a acidification oxidation solution and acidification oxidation gas; the added amount of concentrated hydrochloric acid is 0.4-0.8 L/L immersion solution, the added amount of sodium chlorate is 10-20 g/L immersion solution, the reaction time is 30-60 min, and the reaction temperature is 25-35° C.; The acidification oxidation gas is absorbed by lye and then returned to the acidification oxidation step.

(3) Multi-stage extraction: the acidification oxidation solution obtained in step (2) is subjected to multi-stage extraction with carbon tetrachloride, wherein the volume ratio of carbon tetrachloride to acidification oxidation solution is 1.5:1-2.5:1, and the number of extraction stages is 2-5 with 2-8 min extraction time and 25-35° C.; the extract solution and raffinate is obtained, and the raffinate is evaporated and crystallized to obtain crude sodium bromide for centralized treatment;

(4) Cooperative back extraction: add a back extractor to the extract obtained in step (3) with constantly stirring, when the pH reaches 6-7, stop adding back extractor, and continue the reaction for 5-10 min at 25-35° C. to obtain organic phase and back extraction solution; the organic phase returns to step (3) for reusing; the back extractor is composed of a mixed aqueous solution of sodium carbonate and urea with 3:1 molar ratio, and the concentration of back extractor is 20-40 g/L.

(5) Evaporative crystallization: the back extraction solution obtained in step (4) is subjected to evaporative crystallization to obtain sodium bromide, wherein the evaporative crystallization temperature is 110° C.-140° C.

Compared with the prior art, the present invention enriches and purifies the bromine resource from bromine-containing crude salt by adopting a combination process such as acidification oxidation, multi-stage extraction and cooperative back extraction, and directly recovers the bromine resource through the high-efficiency conversion of bromine resource. There is no waste solution generated during the whole process, and have the benefits of high product purity, simple operation, and environmental friendliness.

DETAILED DESCRIPTION

Embodiment 1

Figure 1:
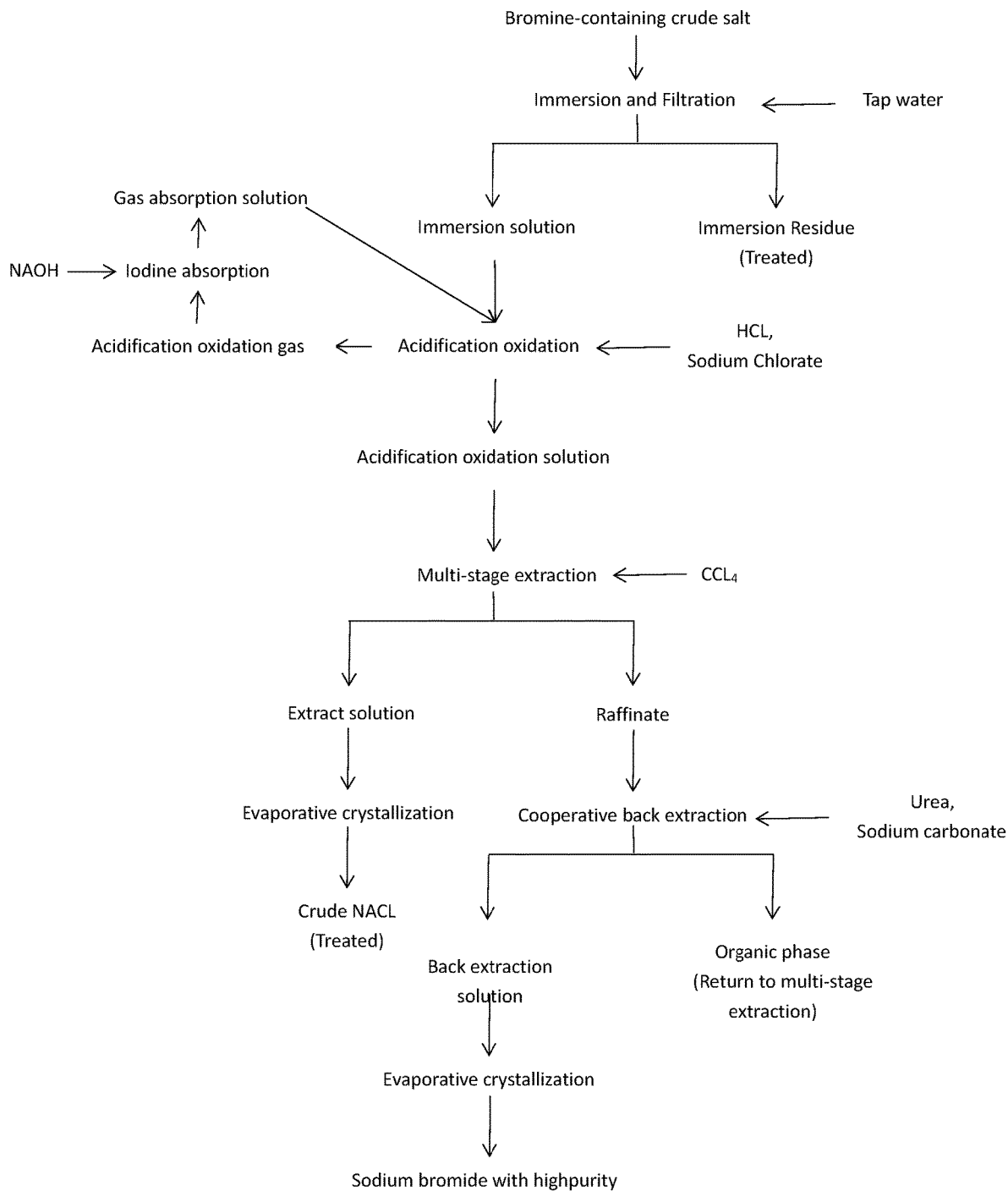
FIG. 1 shows a flow chart of the invention

(1) Immersion and filtration: the bromine-containing crude salt is immersed in tap water and filtered; the ratio of volume of tap water to the mass of bromine-containing crude salt is 3:1 L/kg, the bromine-containing crude salt is immersed with 10 min under 25° C. to obtain immersion solution and immersion residue, treated the immersion residue.

(2) Acidification and oxidation: the immersion solution obtained in step (1) is acidified with 36% concentrated hydrochloric acid, and then sodium chlorate is added with fully stirred, during the period, the pH of the system is maintained at 1 with concentrated hydrochloric acid to obtain a acidification oxidation solution and acidification oxidation gas; the added amount of concentrated hydrochloric acid is 0.4 L/L immersion solution, the added amount of sodium chlorate is 10 g/L immersion solution, the reaction time is 30 min, and the reaction temperature is 25° C.; The acidification oxidation gas is absorbed by lye and then returned to the acidification oxidation step.

(3) Multi-stage extraction: the acidification oxidation solution obtained in step (2) is subjected to multi-stage extraction with carbon tetrachloride, wherein the volume ratio of carbon tetrachloride to acidification oxidation solution is 1.5:1, and the number of extraction stages is 2 with 2 min extraction time and 25° C.; the extract solution and raffinate is obtained, and the raffinate is evaporated and crystallized to obtain crude sodium bromide for centralized treatment;

(4) Cooperative back extraction: add a back extractor to the extract obtained in step (3) with constantly stirring, when the pH reaches 6, stop adding back extractor, and continue the reaction for 5 min at 25° C. to obtain organic phase and back extraction solution; the organic phase returns to step (3) for reusing; the back extractor is composed of a mixed aqueous solution of sodium carbonate and urea with 3:1 molar ratio, and the concentration of back extractor is 20 g/L.

(5) Evaporative crystallization: back extraction solution obtained in step (4) is subjected to evaporative crystallization to obtain sodium bromide, wherein the evaporative crystallization temperature is 110° C.

The recovery rate of sodium bromide is 98.4%, and the purity of the obtained sodium bromide crystals is 99.1%, which meets the standard of superior sodium bromide (NaBr≥9.0%) in the standard HG/T3809-2006 of the Ministry of Chemical Industry.

Embodiment 2

(1) Immersion and filtration: the bromine-containing crude salt is immersed in tap water and filtered; the ratio of volume of tap water to the mass of bromine-containing crude salt is 5:1 L/kg, the bromine-containing crude salt is immersed with 20 min under 35° C. to obtain immersion solution and immersion residue, treated the immersion residue.

(2) Acidification and oxidation: the immersion solution obtained in step (1) is acidified with 36% concentrated hydrochloric acid, and then sodium chlorate is added with fully stirred, during the period, the pH of the system is maintained at 0 with concentrated hydrochloric acid to obtain a acidification oxidation solution and acidification oxidation gas; the added amount of concentrated hydrochloric acid is 0.8 L/L immersion solution, the added amount of sodium chlorate is 20 g/L immersion solution, the reaction time is 60 min, and the reaction temperature is 35° C.; The acidification oxidation gas is absorbed by lye and then returned to the acidification oxidation step.

(3) Multi-stage extraction: the acidification oxidation solution obtained in step (2) is subjected to multi-stage extraction with carbon tetrachloride, wherein the volume ratio of carbon tetrachloride to acidification oxidation solution is 2.5:1, and the number of extraction stages is 5 with 8 min extraction time and 35° C.; the extract solution and raffinate is obtained, and the raffinate is evaporated and crystallized to obtain crude sodium bromide for centralized treatment;

(4) Cooperative back extraction: add a back extractor to the extract obtained in step (3) with constantly stirring, when the pH reaches 7, stop adding back extractor, and continue the reaction for 5 min at 35° C. to obtain organic phase and back extraction solution; the organic phase returns to step (3) for reusing; the back extractor is composed of a mixed aqueous solution of sodium carbonate and urea with 3:1 molar ratio, and the concentration of back extractor is 40 g/L.

(5) Evaporative crystallization: back extraction solution obtained in step (4) is subjected to evaporative crystallization to obtain sodium bromide, wherein the evaporative crystallization temperature is 140° C.

The recovery rate of sodium bromide is 99.3%, and the purity of the obtained sodium bromide crystals is 99.7%, which meets the standard of superior sodium bromide (NaBr≥99.0%) in the standard HG/T3809-2006 of the Ministry of Chemical Industry.

Embodiment 3

(1) Immersion and filtration: the bromine-containing crude salt is immersed in tap water and filtered; the ratio of volume of tap water to the mass of bromine-containing crude salt is 4:1 L/kg, the bromine-containing crude salt is immersed with 15 min under 30° C. to obtain immersion solution and immersion residue, treated the immersion residue.

(2) Acidification and oxidation: the immersion solution obtained in step (1) is acidified with 36% concentrated hydrochloric acid, and then sodium chlorate is added with fully stirred, during the period, the pH of the system is maintained at 0.5 with concentrated hydrochloric acid to obtain a acidification oxidation solution and acidification oxidation gas; the added amount of concentrated hydrochloric acid is 0.6 L/L immersion solution, the added amount of sodium chlorate is 15 g/L immersion solution, the reaction time is 45 min, and the reaction temperature is ° C.; The acidification oxidation gas is absorbed by lye and then returned to the acidification oxidation step.

(3) Multi-stage extraction: the acidification oxidation solution obtained in step (2) is subjected to multi-stage extraction with carbon tetrachloride, wherein the volume ratio of carbon tetrachloride to acidification oxidation solution is 2:1, and the number of extraction stages is 4 with 5 min extraction time and 30° C.; the extract solution and raffinate is obtained, and the raffinate is evaporated and crystallized to obtain crude sodium bromide for centralized treatment;

(4) Cooperative back extraction: add a back extractor to the extract obtained in step (3) with constantly stirring, when the pH reaches 6.5, stop adding back extractor, and continue the reaction for 8 min at 30° C. to obtain organic phase and back extraction solution; the organic phase returns to step (3) for reusing; the back extractor is composed of a mixed aqueous solution of sodium carbonate and urea with 3:1 molar ratio, and the concentration of back extractor is 30 g/L.

(5) Evaporative crystallization: the back extraction solution obtained in step (4) is subjected to evaporative crystallization to obtain sodium bromide, wherein the evaporative crystallization temperature is 125° C.

The recovery rate of sodium bromide is 99.0%, and the purity of the obtained sodium bromide crystals is 99.5%, which meets the standard of superior sodium bromide (NaBr≥9.0%) in the standard HG/T3809-2006 of the Ministry of Chemical Industry.

Embodiment 4

(1) Immersion and filtration: the bromine-containing crude salt is immersed in tap water and filtered; the ratio of volume of tap water to the mass of bromine-containing crude salt is 3.5:1 L/kg, the bromine-containing crude salt is immersed with 13 min under 28° C. to obtain immersion solution and immersion residue, treated the immersion residue.

(2) Acidification and oxidation: the immersion solution obtained in step (1) is acidified with 36% concentrated hydrochloric acid, and then sodium chlorate is added with fully stirred, during the period, the pH of the system is maintained at 0.5 with concentrated hydrochloric acid to obtain a acidification oxidation solution and acidification oxidation gas; the added amount of concentrated hydrochloric acid is 0.6 L/L immersion solution, the added amount of sodium chlorate is 13 g/L immersion solution, the reaction time is 40 min, and the reaction temperature is 28° C.; The acidification oxidation gas is absorbed by lye and then returned to the acidification oxidation step.

(3) Multi-stage extraction: the acidification oxidation solution obtained in step (2) is subjected to multi-stage extraction with carbon tetrachloride, wherein the volume ratio of carbon tetrachloride to acidification oxidation solution is 1.8:1, and the number of extraction stages is 4 with 5 min extraction time and 28° C.; the extract solution and raffinate is obtained, and the raffinate is evaporated and crystallized to obtain crude sodium bromide for centralized treatment;

(4) Cooperative back extraction: add a back extractor to the extract obtained in step (3) with constantly stirring, when the pH reaches 6.5, stop adding back extractor, and continue the reaction for 7 min at 28° C. to obtain organic phase and back extraction solution; the organic phase returns to step (3) for reusing; the back extractor is composed of a mixed aqueous solution of sodium carbonate and urea with 3:1 molar ratio, and the concentration of back extractor is 25 g/L.

(5) Evaporative crystallization: back extraction solution obtained in step (4) is subjected to evaporative crystallization to obtain sodium bromide, wherein the evaporative crystallization temperature is 120° C.

The recovery rate of sodium bromide is 98.8%, and the purity of the obtained sodium bromide crystals is 99.3%, which meets the standard of superior sodium bromide (NaBr≥99.0%) in the standard HG/T3809-2006 of the Ministry of Chemical Industry.

Embodiment 5

(1) Immersion and filtration: the bromine-containing crude salt is immersed in tap water and filtered; the ratio of volume of tap water to the mass of bromine-containing crude salt is 4.5:1 L/kg, the bromine-containing crude salt is immersed with 17 min under 30° C. to obtain immersion solution and immersion residue, treated the immersion residue.

(2) Acidification and oxidation: the immersion solution obtained in step (1) is acidified with 36% concentrated hydrochloric acid, and then sodium chlorate is added with fully stirred, during the period, the pH of the system is maintained at 0-1 with concentrated hydrochloric acid to obtain a acidification oxidation solution and acidification oxidation gas; the added amount of concentrated hydrochloric acid is 0.7 L/L immersion solution, the added amount of sodium chlorate is 17 g/L immersion solution, the reaction time is 50 min, and the reaction temperature is ° C.; The acidification oxidation gas is absorbed by lye and then returned to the acidification oxidation step.

(3) Multi-stage extraction: the acidification oxidation solution obtained in step (2) is subjected to multi-stage extraction with carbon tetrachloride, wherein the volume ratio of carbon tetrachloride to acidification oxidation solution is 2.5:1, and the number of extraction stages is 4 with 7 min extraction time and 30° C.; the extract solution and raffinate is obtained, and the raffinate is evaporated and crystallized to obtain crude sodium bromide for centralized treatment;

(4) Cooperative back extraction: add a back extractor to the extract obtained in step (3) with constantly stirring, when the pH reaches 6.5, stop adding back extractor, and continue the reaction for 8 min at 35° C. to obtain organic phase and back extraction solution; the organic phase returns to step (3) for reusing; the back extractor is composed of a mixed aqueous solution of sodium carbonate and urea with 3:1 molar ratio, and the concentration of back extractor is 30 g/L.

(5) Evaporative crystallization: the back extraction solution obtained in step (4) is subjected to evaporative crystallization to obtain sodium bromide, wherein the evaporative crystallization temperature is 130° C.

The recovery rate of sodium bromide is 99.2%, and the purity of the obtained sodium bromide crystals is 99.6%, which meets the standard of superior sodium bromide (NaBr≥99.0%) in the standard HG/T3809-2006 of the Ministry of Chemical Industry.

Embodiment 6

(1) Immersion and filtration: the bromine-containing crude salt is immersed in tap water and filtered; the ratio of volume of tap water to the mass of bromine-containing crude salt is 4:1 L/kg, the bromine-containing crude salt is immersed with 16 min under 30° C. to obtain immersion solution and immersion residue, treated the immersion residue.

(2) Acidification and oxidation: the immersion solution obtained in step (1) is acidified with 36% concentrated hydrochloric acid, and then sodium chlorate is added with fully stirred, during the period, the pH of the system is maintained at 0-1 with concentrated hydrochloric acid to obtain a acidification oxidation solution and acidification oxidation gas; the added amount of concentrated hydrochloric acid is 0.6 L/L immersion solution, the added amount of sodium chlorate is 17 g/L immersion solution, the reaction time is 50 min, and the reaction temperature is 25° C.; The acidification oxidation gas is absorbed by lye and then returned to the acidification oxidation step.

(3) Multi-stage extraction: the acidification oxidation solution obtained in step (2) is subjected to multi-stage extraction with carbon tetrachloride, wherein the volume ratio of carbon tetrachloride to acidification oxidation solution is 2:1, and the number of extraction stages is 3 with 4 min extraction time and 25° C.; the extract solution and raffinate is obtained, and the raffinate is evaporated and crystallized to obtain crude sodium bromide for centralized treatment;

(4) Cooperative back extraction: add a back extractor to the extract obtained in step (3) with constantly stirring, when the pH reaches 7, stop adding back extractor, and continue the reaction for 7 min at 25° C. to obtain organic phase and back extraction solution; the organic phase returns to step (3) for reusing; the back extractor is composed of a mixed aqueous solution of sodium carbonate and urea with 3:1 molar ratio, and the concentration of back extractor is 25 g/L.

(5) Evaporative crystallization: the back extraction solution obtained in step (4) is subjected to evaporative crystallization to obtain sodium bromide, wherein the evaporative crystallization temperature is 135° C.

The recovery rate of sodium bromide is 99.1%, and the purity of the obtained sodium bromide crystals is 99.4%, which meets the standard of superior sodium bromide (NaBr≥99.0%) in the standard HG/T3809-2006 of the Ministry of Chemical Industry.

The invention claimed is:

1. A method for recovering high-purity sodium bromide from bromine-containing crude salt, comprising steps are as follows:
(1) immersion and filtration: immersing bromine-containing crude salt in tap water and filtering the tap water with the immersed bromine-containing crude salt to obtain an immersion solution and an immersion residue, wherein a ratio of volume of tap water to mass of the bromine-containing crude salt is 3:1-5:1 L/kg, the bromine-containing crude salt is immersed for 10-20 minutes under 25-35° C. to obtain the immersion solution and the immersion residue, in which the mass ratio of bromine-containing crude salt is 5-25%;
(2) acidification and oxidation: performing an acidification and oxidation reaction by acidifying the immersion solution obtained in step (1) with 36% concentrated hydrochloric acid, and then adding sodium chlorate to the immersion solution while stirring the immersion solution, wherein a pH of the immersion solution is maintained at 0-1 with the concentrated hydrochloric acid to obtain an acidification oxidation solution and acidification oxidation gas, an amount of the added concentrated hydrochloric acid is 0.4-0.8 L/L of the immersion solution, an amount of the added sodium chlorate is 10-20 g/L of the immersion solution, a time of the acidification and oxidation reaction is 30-60 min, and a temperature of the acidification and oxidation is 25-35° C.;
(3) multi-stage extraction: subjecting the acidification oxidation solution obtained in step (2) to a multi-stage extraction with carbon tetrachloride, wherein a volume ratio of the carbon tetrachloride to the acidification oxidation solution is 1.5:1-2.5:1, and a number of extraction stages in the multi-stage extraction is 2-5 with 2-8 min extraction time and a temperature of the multi-stage extraction is 25-35° C., wherein an extract solution and a raffinate obtained as a result of the multi-stage extraction, and wherein the raffinate is evaporated and crystallized to obtain crude sodium bromide for centralized treatment;
(4) cooperative back extraction: performing a cooperative back extraction reaction by adding a back extractor to the extract solution obtained in step (3) while stirring the extract solution, and when a pH of the extract solution reaches 6-7, stopping adding the back extractor, and continuing the cooperative back extraction reaction for 5-10 minutes at 25-35° C. to obtain an organic phase and a back extraction solution; and
(5) evaporative crystallization: subjecting the back extraction solution obtained in step (4) to evaporative crystallization to obtain sodium bromide, wherein a temperature of the evaporative crystallization is 110° C.-140° C.

2. A method for recovering high-purity sodium bromide from bromine-containing crude salt according to claim 1, wherein the back extractor in step (4) comprises a mixed aqueous solution of sodium carbonate and urea with a 3:1 molar ratio, and a concentration of the back extractor is 20-40 g/L.

3. A method for recovering high-purity sodium bromide from bromine-containing crude salt according to claim 1, wherein the acidification oxidation gas is absorbed by lye and then returned to the acidification and oxidation step.

4. A method for recovering high-purity sodium bromide from bromine-containing crude salt according to claim 1, wherein the organic phase is returned to step (3) for reuse.

* * * * *